March 11, 1969  F. M. STERN  3,432,389

CORE DESIGN FOR NUCLEAR REACTOR

Filed July 25, 1966

INVENTOR
FRED M. STERN
BY Eldon H. Luther
ATTORNEY

United States Patent Office 3,432,389
Patented Mar. 11, 1969

3,432,389
CORE DESIGN FOR NUCLEAR REACTOR
Fred M. Stern, Northridge, Calif., assignor to Combustion Engineering, Inc., Windsor, Conn., a corporation of Delaware
Filed July 25, 1966, Ser. No. 567,560
U.S. Cl. 176—40                                     4 Claims
Int. Cl. G21c 3/20, 3/04

ABSTRACT OF THE DISCLOSURE

A first core for use in a heterogeneous nuclear reactor with which batch type refueling is to be utilized so as to produce an eventual equilibrium core. The zone of this core from which fuel is to be finally removed being provided with a stainless steel cladding and with a decreased enrichment compared to the zone into which fuel is to be initially introduced. The fuel in this latter zone being provided with a zirconium cladding.

---

This invention relates generally to nuclear reactors and has specific relation to an improved first core design of relatively large power reactors.

Present day power reactors such as those of the boiling and pressurized water type employ a core that is made up of a relatively large number of fuel assemblies, each assembly which, in turn, is comprised of a number of relatively long parallel tubes within which is contained the nuclear fuel, the tubes in effect forming a cladding for the fuel to prevent corrosion thereof. These cores are designed and the reactor is operated so that at each refueling cycle only a portion of the fuel is removed from the core and replaced by new fresh fuel. This is called batch-type refueling and with this arrangement there is eventually produced in the core what is termed an equilibrium core with this term being well known to those skilled in the art and, accordingly, not further explained herein other than to say that after utilizing a predetermined amount of energy from the core after refueling, the composition of the fuel in each of the zones of the core will be a predetermined value, and this same general value will prevail after this same amount of energy has been utilized subsequent to each refueling of the equilibrium core.

In the bach refueling technique the fuel is shuffled from one zone of the core to another. For instance, in a core that has two zones, one in the center of the core and one in the outer region of the core, the center fuel may be removed at refueling and the fuel in the outer region moved into the center and new fresh fuel placed in the outer region. The fuel that is thus positioned in the center region of the core after refueling, has been partially utilized and contains poisons that are produced as the result of utilization of the fuel. Since the reactor is designed to operate with an equilibrium core which has this characteristic, it is desired that the first core in the reactor approach the equilibrium core characteristic as close as possible. To effect this it is necessary that the enrichment of the fuel in the center region in the example given hereinbefore be decreased relative to that in the outer region, and it is also necessary that some means be utilized to provide an effect somewhat comparable to the effect that the poison produces within this fuel in the equilibrium core.

This is accomplished in the present invention by providing a cladding for the lower enrichment fuel which has a greater neutron absorption cross section than the cladding for the fuel used in the region or zone of high enrichment. Specifically, it is the purpose of the invention to provide the fuel in the low enrichment region of the first core of the reactor with a stainless steel cladding and the fuel in the high enrichment region of the core with a zirconium or zirconium alloy cladding. This tends to achieve the aforesaid objective with regard to the first core approaching the equilibrium core and also provides for a more economic core construction since the stainless steel cladding is considerably less expensive than the zirconium cladding and to provide this relatively inexpensive cladding on the fuel which is removed from the core in a relatively short time (being removed in the first refueling) effects a substantial economy.

Accordingly, it is an object of the present invention to reduce the fuel cycle cost of the first core of a nuclear reactor and at the same time make the characteristics of this core with relation to fuel makeup and power distribution approximate that of the equilibrium core of the reactor.

Other and further objects of the invention will become apparent to those skilled in the art as the description proceeds:

With the aforementioned objects in view, the invention comprises an arrangement, construction and combination of the elements of the inventive organization in such a manner as to obtain the results desired as hereinafter more particularly set out in the following detailed description of an illustrative embodiment, said embodiment being shown by the accompanying drawings wherein.

Figure 1:
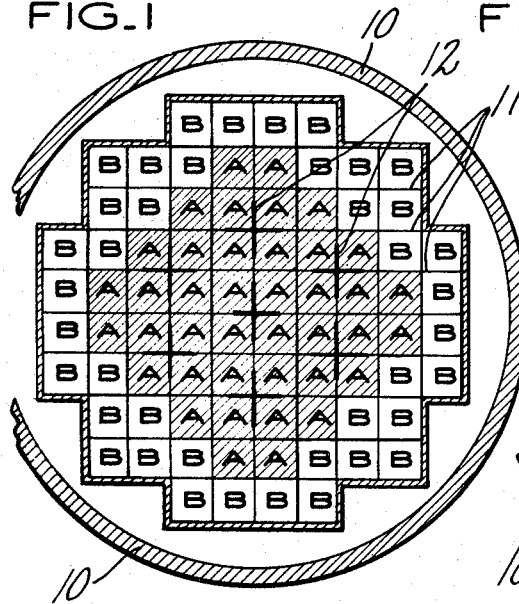
FIG. 1 is a transverse section, fragmentary in nature, of a nuclear reactor having a core fabricated in accordance with the present invention.

Referring now to the drawings, wherein like reference characters are used throughout to designate like elements, there is disclosed in FIG. 1 a nuclear reactor which may be, for example, of the boiling water or pressurized water type and wherein the core is divided or arranged into two zones. The core is housed within the vessel 10 and it is made up of a plurality of square-shaped fuel assemblies 11. As is conventional, these assemblies are disposed within the core as a unit and are positioned between upper and lower plates or grids which retain the assemblies in their proper place.

Each of the assemblies is, in turn, made up of a substantial number of long tubes 13 which may, for example, be ½ inch in diameter, and these tubes are filled with the nuclear fuel 15 which may be in the form of pellets or a powder compacted therewithin and which may be uranium dioxide containing $U_{238}$ with a predetermined amount of $U_{235}$ or $U_{233}$ enrichment.

Dispersed among the fuel assemblies are control rods 12 for regulation of the reactor.

The core disclosed in FIG. 1 is divided into two zones for refueling purposes with the fuel assemblies designated A comprising one zone and the fuel assemblies designated B comprising the other zone.

During refueling of the core the spent fuel assemblies A are removed from the core while the fuel assemblies B are removed from their outer location into the location formerly occupied by the assemblies A. In an equilibrium core having this two-zone arrangement and utilizing fuel shuffling in accordance with the system just mentioned the enrichment of the fuel in zone A is considerably less, i.e. the percentage of $U_{235}$ is considerably less than that of the fuel in zone B. Additionally, the fuel in zone A contains poisons produced as a result of fissioning of the fuel when in zone B. Thus at refueling of the equilibrium core fresh fuel is contained in zone B while partially depleted fuel is contained in zone A which has these characteristics of containing less $U_{235}$ and also containing poison.

In accordance with the invention the first core provided for the reactor is constructed so that the fuel rods in the zone A are of stainless steel so as, in effect, to provide a cladding of stainless steel for the fuel contained therein and the fuel within these stainless steel tubes is of a predetermined enrichment less than the fuel contained in the zone B. In this zone B the fuel is contained within zirconium or zirconium alloy tubes and this fuel is at the full desired $U_{235}$ enrichment.

As the burnup of the fuel in a reactor is increased, the initial cost of the cladding material loses importance and the neutron economy of the cladding becomes the overriding factor in the selection of the cladding material. Stainless steel cladding is considerably more economical than zirconium or zirconium alloy cladding and since, in the initial core in the reactor the fuel in zone A is in the core only half the time of the fuel in zone B, the cladding cost or general fuel cost with relation to zone A is of significance.

The high enrichment regions remaining in the core for high burnup need the high neutron economy and the initial cost of the clad material is distributed over a large amount of energy. In the low enrichment regions, the neutron economy is not very important and it is essential to keep the cost of materials low since it is distributed over a relatively small amount of energy. In addition, the stainless steel or other high neutron-absorbing materials introduce a poison into the low enrichment region which tends to simulate the fission product poison present in the low enrichment region of the equilibrium core. And, therefore, the core geometry can be optimized for the equilibrium core and still operate satisfactorily without excessive power peaking in the first core as well.

Figure 2:
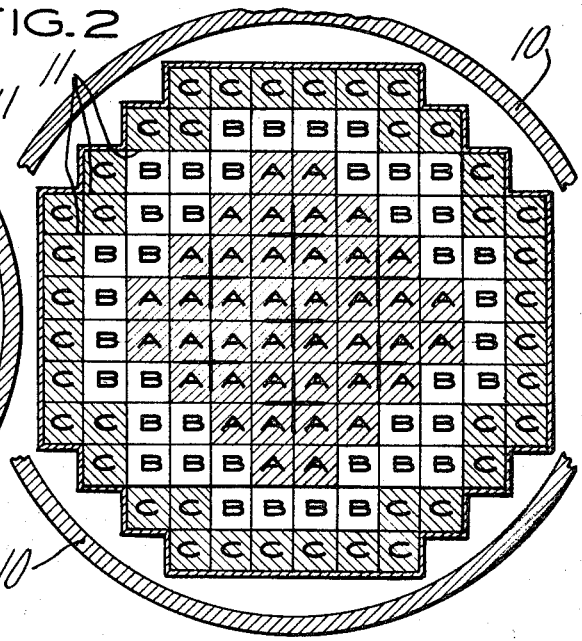
FIG. 2 is a view similar to that of FIG. 1 but showing a modified arrangement.
Figure 3:
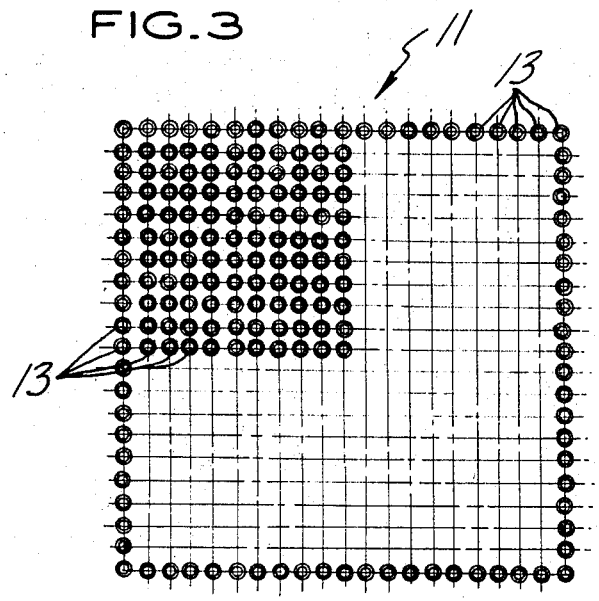
FIG. 3 is a transverse section of one of the fuel assemblies.
Figure 4:
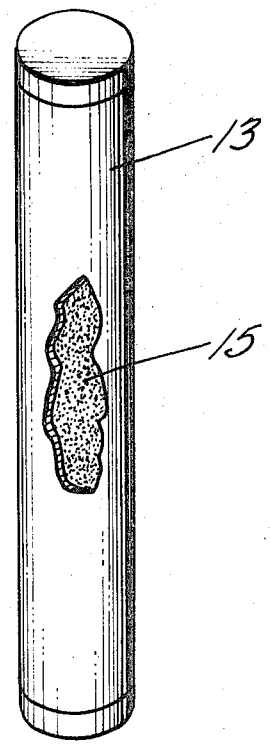
FIG. 4 is a perspective view of a fuel rod employed in the assemblies.

The arrangement of FIG. 2 is generally similar to that of FIG. 1 but in lieu of a two-zone core arrangement there is provided a three-zone arrangement. The fuel assemblies in these zones are identified as A, B and C. In this three-zone arrangement the initial core for the reactor has stainless steel clad fuel elements in zones A and B and zirconium or zirconium alloy clad elements in zone C, and the fuel is shuffled inward from zone C to zone B to zone A. Thus the same economy and approximation of an equilibrium core is provided for this initial three-zone core. There is also produced a relatively flat power distribution transversely of the core.

Accordingly, with the invention there is provided an improved initial reactor core design which is of reduced cost and which provides for an arrangement that approximates the characteristic of the equilibrium core.

While I have illustrated and described a preferred embodiment of my invention it is to be understood that such is merely illustrative and not restrictive and that variations and modifications may be made therein without departing from the spirit and scope of the invention. I therefore do not wish to be limited to the precise details set forth but desire to avail myself of such changes as fall within the purview of my invention.

What I claim is:

1. In a nuclear reactor cooled and moderated by water and utilizing batch refueling so as to eventually produce an equilibrium core, the improvement comprising a first core therefor, said first core being zoned with the zones having varying fuel enrichments to approximate the fuel composition of the eventual equilibrium core and with the fuel of the core having a protective cladding, and having the fuel in the zone of highest enrichment with zirconium or zirconium alloy cladding and having the fuel in the zone of lowest enrichment with stainless steel cladding.

2. The organization of claim 1 wherein said first core is divided into two zones concentrically arranged, the fuel in the outermost zone being of higher enrichment than that in the innermost zone.

3. The organization of claim 1 wherein said first core has three concentrically arranged zones, the fuel in the outermost being of highest enrichment while the fuel in the innermost is of the lowest enrichment with the fuel in the intermediate being of an enrichment intermediate that of the outer and inner zones, the fuel in said intermediate and innermost zones being clad with stainless steel.

4. In a nuclear reactor cooled and moderated by water and utilizing a core comprised of tubular fuel elements in parallel relation and wherein the nuclear fuel is housed within a tube that acts as a cladding for the fuel, said reactor utilizing batch refueling so as to eventually produce an equilibrium core divided into a plurality of zones wherein the enrichment of the fuel varies significantly from zone to zone, a first core for use in said reactor wherein the enrichment of the fuel in the several zones of the core approximates that of the equilibrium core, the fuel in the zones of high enrichment being clad with zirconium or a zirconium containing alloy and the fuel in the zones of low enrichment being clad with stainless steel.

References Cited

UNITED STATES PATENTS

| | | | |
|---|---|---|---|
| 2,864,758 | 12/1958 | Shackelford | 176—91 X |
| 3,103,476 | 9/1963 | Mumm | 176—91 X |
| 3,145,150 | 8/1964 | Gylfe | 176—91 X |
| 3,168,399 | 2/1965 | Takahashi | 176—91 X |
| 3,211,621 | 10/1965 | Greagan | 176—91 X |
| 3,235,463 | 2/1966 | Sankovich | 176—17 |
| 3,262,860 | 7/1966 | Zebroski | 176—91 |
| 3,243,351 | 3/1966 | Campbell et al. | 176—54 X |

REUBEN EPSTEIN, *Primary Examiner.*

U.S. Cl. X.R.

176—41, 91